US012240741B2

(12) United States Patent
Hausladen

(10) Patent No.: US 12,240,741 B2
(45) Date of Patent: Mar. 4, 2025

(54) CABLE WINCH AND HOISTING DEVICE HAVING SUCH A CABLE WINCH

(71) Applicant: Liebherr-Components Biberach GmbH, Biberach an der Riss (DE)

(72) Inventor: Norbert Hausladen, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 277 days.

(21) Appl. No.: 17/649,706

(22) Filed: Feb. 2, 2022

(65) Prior Publication Data

US 2022/0185638 A1 Jun. 16, 2022

Related U.S. Application Data

(63) Continuation of application No. PCT/EP2020/071650, filed on Jul. 31, 2020.

(30) Foreign Application Priority Data

Aug. 2, 2019 (DE) ..................... 10 2019 120 970.6
Oct. 2, 2019 (DE) ..................... 10 2019 126 699.8

(51) Int. Cl.

| | |
|---|---|
| ***B66D 1/48*** | (2006.01) |
| ***B65H 54/28*** | (2006.01) |
| ***B66C 13/46*** | (2006.01) |
| ***B66D 1/38*** | (2006.01) |

(52) U.S. Cl.

CPC ......... *B66D 1/485* (2013.01); *B65H 54/2875* (2013.01); *B66C 13/46* (2013.01); *B66D 1/38* (2013.01); *B65H 2701/35* (2013.01)

(58) Field of Classification Search

CPC ........ B66D 1/36–39; B66D 1/40; B66D 1/48; B66D 1/485; B66D 1/54; B66D 1/56; B65H 54/2869–2878

See application file for complete search history.

(56) References Cited

U.S. PATENT DOCUMENTS 4,410,147 A * 10/1983 Seibert ............... B65H 54/2875 242/478.2
4,570,875 A 2/1986 Buluschek
(Continued)

FOREIGN PATENT DOCUMENTS

AT 011687 3/2011
CN 1586934 3/2005
(Continued)

*Primary Examiner* — Sang K Kim
*Assistant Examiner* — Nathaniel L Adams
(74) *Attorney, Agent, or Firm* — Levine Bagade Han LLP

(57) ABSTRACT

The present invention relates to a cable winch, in particular a hoisting gear winch of a hoist, comprising a cable drum, an entry guide for a cable to be wound onto the cable drum, and an actuating drive for adjusting the entry guide relative to the cable drum. The invention also relates to a hoisting device, in particular in the form of a crane, having such a cable winch. According to the invention, a detection unit for detecting an image of the progression of the winding of the cable wound onto the cable drum is provided and the control unit is designed to adjust the entry guide relative to the cable drum depending on the winding progression image captured.

23 Claims, 4 Drawing Sheets

(56) References Cited

U.S. PATENT DOCUMENTS

| | | | | | |
|---|---|---|---|---|---|
| 4,928,904 | A * | 5/1990 | Watts | ................. | B65H 54/2878<br>242/478.2 |
| 6,443,385 | B1 * | 9/2002 | Grandauer | ......... | B65H 54/2875<br>242/478.2 |
| 6,811,112 | B1 | 11/2004 | Currie et al. | | |
| 2006/0144986 | A1 | 7/2006 | Tsai | | |
| 2018/0305168 | A1 * | 10/2018 | Mordeglia | ......... | B65H 54/2872 |
| 2019/0062127 | A1 * | 2/2019 | Hesselbein | .............. | B66D 1/54 |

FOREIGN PATENT DOCUMENTS

| | | | | |
|---|---|---|---|---|
| CN | 101832760 | | 12/2011 | |
| CN | 107531333 | A * | 1/2018 | ......... B65H 75/4484 |
| DE | 19726285 | | 12/1998 | |
| DE | 19954072 | | 5/2001 | |
| EP | 2807108 | | 4/2016 | |
| GB | 2456626 | | 7/2009 | |
| JP | H01-203171 | | 8/1989 | |
| JP | 2003-121376 | | 4/2003 | |
| JP | 2009-057126 | | 3/2009 | |
| WO | WO 2015/139842 | | 9/2015 | |
| WO | WO 2017/064683 | | 4/2017 | |
| WO | WO 2021/023653 | | 2/2021 | |

* cited by examiner

CABLE WINCH AND HOISTING DEVICE HAVING SUCH A CABLE WINCH

CROSS-REFERENCE TO RELATED APPLICATIONS

This application is a continuation of International Patent Application Number PCT/EP2020/071650 filed Jul. 31, 2020, which claims priority to German Patent Application Numbers DE 10 2019 120 970.6 filed Aug. 2, 2019 and DE 10 2019 126 699.8 filed Oct. 2, 2019, the contents of which are incorporated herein by reference in their entireties.

BACKGROUND

The present invention relates to a cable winch, in particular a hoisting gear winch of a hoist, comprising a cable drum, an entry guide for a cable to be wound onto the cable drum, and an actuating drive for adjusting the entry guide relative to the cable drum. The invention also relates to a hoisting device, in particular in the form of a crane, having such a cable winch.

Cable winches wind and unwind the same cable repeatedly under different boundary conditions, wherein without any fixed rules, for example, the cable tension can vary considerably as a result of the specific load on the cable, so that the cable can, for example, be wound up for a short distance under strong tension and then, after depositing the load, be wound up a further short distance without load or even loosely. Similarly, during unwinding, the cable may be subject to strong tension or be loosely unwound, and these states may either intermingle or complement each other in different ways, so that at one point a lower winding layer may be wound under large tension and a layer located thereabove may be loosely wound and another layer wound over it again may be tightly wound, or else only one part, for example of a lower layer, can be tightly wound and another part can be loosely wound.

Such changes in cable tension or other cable or operating parameters, which vary differently during winding and unwinding and are not subject to any fixed rule, not only affect the image of the progression of the winding of the cable per se and can, for example, lead to the cutting in of the cable during winding or unwinding under strong tension in an underlying, loosely wound cable layer, but also result in other changes in cable parameters, which in turn can adversely affect the winding progression image. For example, the cable diameter changes due to the varying strand tension, so that a cable section wound or unwound under strong tension has a smaller diameter than a loosely wound cable section, which can, for example, cause the cable to taper in cross-section under longitudinal elongation. At the same time, there may also change the transverse resilience or the longitudinal resilience of the cable. On the other hand, the varying strand tension also leads to deformations and squeezing or varying deformations and varying squeezing of the cable in the winding layers, so that winding problems can occur during winding, but also occasionally during unwinding. Since said alterations of relevant winding parameters can occur in different phases of winding and unwinding under no fixed rules, it is difficult to control the entry guide appropriately in order to achieve a consistent, "beautiful" winding progression image.

Said problem exists in principle with steel cables, which may consist of steel cords, and is further aggravated in the case of high-strength fiber ropes. In recent times, for hoisting devices such as cranes, where small cable weight combined with high strengths of the cable are of greater importance, there have been used high-strength fiber ropes which, compared to conventional steel cables, have a smaller cable weight combined with higher strengths of the cable and also a longer service life. Such high-strength fiber ropes may be made of, or at least comprise, high-strength synthetic fibers such as aramid fibers, aramid/carbon fiber blends, high-modulus polyethylene (HMPE) fibers, liquid crystal polymer (LCP) vectran or poly(p-phenylene-2,6-benzobisoxazole) fibers (PBO). Thanks to the weight saving of up to 80% compared with steel cables, with almost the same fracture strength, the lifting capacity or the admissible hoisting load can be increased, since the self-weight of the cable to be taken into consideration for the lifting capacity is significantly lower. Particularly in the case of cranes with a large lifting height, or in boom or mast adjustment gears using pulley blocks of a high reeve count, considerable cable lengths and thus also a corresponding cable weight occur, so that weight reduction possible through high-strength fiber ropes is very advantageous. In addition to the weight advantage of the fiber rope itself, there is the additional fact that the use of fiber ropes also enables a weight saving in further components. For example, the lifting hook can be made lighter since less lifting hook weight is needed for the rope tensioning of a fiber rope.

In addition to the named weight advantages, cable drives with synthetic fiber ropes are characterized by a considerably larger service life, easier handling, and good flexibility as well as the no longer required rope lubrication. A greater unit availability can hereby be achieved overall.

However, one difficulty with such high-strength fiber ropes is achieving proper winding on the cable drum. High-strength fiber ropes have an inherently low shear stress stiffness, so that the cross-section of high-strength fiber ropes can deform more in the winding turns when they are wound onto the cable drum. This can lead, for example, to the fiber rope cutting in between two winding turns of an underlying winding layer when the drum is wound in several layers, which can lead to increased wear and to greater irregularities in the rope tensioning during unwinding. On the other hand, the cable winding may build up unevenly over the drum length, for example piling up in several layers towards one drum flanged wheel before the cable runs to the opposite flanged wheel and forms there new layers. On the one hand, this can be due to the fact that the cable cuts in between two previous winding layers due to deforming cross-sections, and on the other hand, it can lead to the flanged wheel and also the cable drum being loaded unevenly and more than necessary.

In order to address this problem, it has already been proposed that fiber ropes be designed with a stress resistant sheath in order to approximate the properties of the fiber ropes in the shear stress direction of the steel cable and thus ensure undisturbed winding onto a cable drum, wherein the winding system of the cable winch, which is known per se for steel cables, can remain unchanged in terms of its basic principle with a special grooving for multi-layer winding. However, the sheathing of the fiber ropes is very complex and expensive; in addition, the cable diameters increase due to the sheathing. In this respect, it would be advisable to improve the winding system of the cable winch to such an extent that high-strength fiber ropes can also be wound cleanly without a stress resistant sheath or, in general, cables with limited shear stress stiffness.

In order to achieve an adequate image of the progression of the winding of the cable on the cable drum with evenly piled up winding layers, an entry guide is used per se, which guides the cable to be wound up back and forth from right to left over the drum length. Such entry guides, sometimes referred to as compensators, usually guide the cable back and forth between the flanged wheels of the cable winch at a transverse speed that depends on the winch speed. The feed of the cable guide is usually kinematically fixed mechanically to the rotation of the cable winch, so that there results a predetermined transverse travel path of the entry guide depending on the drum rotation.

Usually, the entry guide is moved transversely. However, it is also already known to achieve the relative movement between the entry guide and the cable drum by adjusting the cable drum in the direction of the longitudinal drum axis, see for example EP 28 07 108 B1.

However, it has also already been suggested that the entry guide should not be mechanically fixed to the drum rotation, but should be electronically controlled and adapted to different winding conditions. For example, AT 11687 U1 describes a cable winch whose entry guide carriage is adjusted by a carriage drive which is actuated by a controller depending on the run-in angle of the cable in such a way that the run-in angle of the cable onto the drum assumes a predetermined value or comes as close as possible to this value.

U.S. Pat. No. 6,811,112 B1 further describes a cable winch that is to be used for different cable diameters and provides different transverse speeds of the entry guide for this purpose. The carriage drive of the cable guide carriage is also controlled depending on the cable angles, wherein on the one hand a cable run-off angle and a cable run-in angle are mechanically sensed and used to set the carriage speed.

With such controllable or adjustable entry guides, the desired run-in angle of the cable to be wound up can be maintained and adapted to different cable diameters or cable types. In the case of high-strength fiber ropes or generally cables with small shear stress stiffness, however, said issues and winding errors can still occur, in particular the aforementioned cutting in of the cable between two underlying cable winding turns.

SUMMARY

It is therefore the underlying object of the present invention to provide an improved cable winch and an improved hoisting device of the initially named kind which avoid disadvantages of the prior art and further develop the latter in an advantageous manner. In particular, adequate winding should also be achieved for cables with low shear stress stiffness, so that even high-strength fiber ropes without a stress resistant sheath can be wound up adequately.

Said task is solved, according to the invention, with a cable winch as claimed in claim 1 and a hoisting device as claimed in claim 20. Preferred embodiments of the invention are the subject-matter of the dependent claims.

It is therefore proposed to monitor the cable as it is wound and the winding progression image that develops on the drum, and to intervene in the adjustment of the entry guide relative to the cable drum when the image of the progression of the winding of the cable changes due to the varying strand tensions and the associated cable diameter changes. According to the invention, a detection unit for detecting the cable and an image of the progression of the winding of the cable wound onto the cable drum is provided and the control unit is designed to adjust the entry guide relative to the cable drum depending on the winding progression image captured, when varying strand tensions result in changes in the cable and/or the winding progression image. The adjustment of the relative position of the entry guide and the cable drum depending on the image of the progression of the winding of the cable detected on the cable drum is based on the consideration that even if a predetermined run-in angle of the cable is adhered to as precisely as possible, winding errors can occur and the desired winding progression image is not necessarily achieved. Winding errors can occur and the desired winding progression image is not necessarily achieved, even if the same cable is repeatedly wound and unwound, if changes in relevant cable parameters occur due to different cable tensions during winding and/or unwinding, and winding errors can be better countered if the real winding progression image occurring on the drum is actually monitored and not just an influencing variable such as the run-in angle of the cable is measured.

In particular, the detection unit can detect the changing cable diameter or cable diameter changes and, depending on such cable diameter changes, which may be caused by the varying cable tension during winding and/or unwinding, the control or adjustment of the entry guide and its movement relative to the cable drum can be adapted in order to achieve an adequate image of the progression of the winding of the cable. The control of the entry guide can be dynamically adjusted depending on the varying cable tension and/or an associated change in a cable parameter such as the cable diameter and/or the transverse elasticity or the longitudinal elasticity of the cable. If, for example, the cable diameter becomes thinner due to increasing cable tension, the travel speed of the entry guide can, for example, be reduced to avoid gaps forming between the cable turns, or, if necessary, increased to get over the dips of an underlying winding layer more quickly.

In further development of the invention, the detection unit can in particular detect the envelope contour of the cable winding on the cable drum or determine it as a characteristic of the winding progression image, wherein the controller can then carry out the transverse adjustment of the entry guide relative to the cable drum depending on envelope curve captured.

The enveloping contour of the cable winding on the cable drum means the envelope curve laid over the respective uppermost cable turns when the cable drum and the cable winding located thereon are viewed in a cross-sectional plane containing the longitudinal axis of the drum. If the cable drum is wound in a single layer and completely between the two flanged wheels, the envelope contour is, for example, a straight line, whereas if a second layer is additionally wound up to, for example, half of the drum, the envelope contour is a stair step or step contour. However, if the winding is not uniform, for example with three or four plies on one flanged wheel, one or two plies in the center of the drum and five or six plies towards the other flanged wheel, the envelope contour will have a curved shape.

The envelope contour does not necessarily have to be detected or determined in one cross-sectional plane, but envelope contours can also be detected or determined in several cross-sectional planes, each of which contains the longitudinal axis of the drum and can be rotated relative to one another, in which case the envelope contour can be based, for example, on an average value of the various envelope curves in the different observation planes. In particular, said envelope curve can also be determined during ongoing winding operation, i.e. with the cable drum rotating, wherein the envelope curve can change continuously in a cross-sectional plane monitored by the detection unit, so that the determined envelope curve can be continuously recorrected, for example by incrementally recalculating changes in the signal of the detection unit or integrating them into the existing envelope curve.

The winding progression image of the cable winding on the cable drum can basically be detected or determined in various ways, for example by means of a light barrier which detects the shading produced by the winding paths, wherein the contour of the detected shading can be determined as an envelope contour.

In particular, however, the detection unit may comprise optical image acquisition means for capturing an image of the cable winding on the cable drum and an image evaluation device for evaluating the image of the cable winding captured.

The optical image acquisition means can in particular comprise at least one camera which provides a camera image of the cable winding or the image of the progression of the winding of the cable on the cable drum, said camera being able to provide a continuous image or a live image even when the cable winch is running, which is then evaluated by the image evaluation device, in particular in order to determine said envelope curve of the cable winding on the cable drum.

Alternatively or additionally to a camera, however, the optical image acquisition device can also have another optical sensor system, in particular in the form of at least one imaging sensor, in order to provide an image of the cable winding on the cable drum, which is then evaluated by the image evaluation device.

The image evaluation device can basically comprise different evaluation modes. For example, pixel analysis, light-dark analysis, grayscale analysis, and/or contour analysis can be performed.

For example, the image evaluation device can have contour evaluation means that determine contours visible in the camera and/or sensor image and can determine the envelope contour of the cable winding from the position of the contours.

Alternatively or additionally, the image evaluation device can also comprise color area fraction evaluation means in order to determine the area fraction of a respective color in the captured image and from this to be able to determine the winding progression image of the wound cable, in particular cable turn courses and/or cable turn intersections and/or cable turn distances and/or the envelope contour of the cable winding.

Alternatively or additionally, the image evaluation device can also have gray scale evaluation means in order to determine gray scales visible in the image and from this to determine said parameters of the winding progression image, in particular the envelope curve of the cable winding. In particular, the image evaluation device may also comprise cable diameter determining means to be able to detect a changing cable diameter or cable diameter changes in order to be able to take such diameter changes into account when controlling the entry guide.

The controller can adjust the entry guide in various ways, depending on which winding progression image and/or which envelope contour is desired and what the detected, actual winding progression image and/or the detected envelope contour looks like. In order to avoid major winding errors, the controller can have a comparison device which compares the winding progression image captured with a predefined target winding progression image and controls the entry guide depending on the comparison in such a way that deviations between the winding progression image captured and the target winding progression image become as small as possible. In particular, said comparison device can compare the determined envelope curve of the cable winding on the drum with a target envelope contour and control the adjustment drive of the entry guide in such a way that the detected envelope contour is matched as closely as possible to the preset target contour. For example, if a dent in the envelope contour is detected in a section of the cable drum that implies one or more missing cable turns, the entry guide can be adjusted so that the cable runs onto the drum in the area of said dent to fill the dent. If, vice versa, a winding bump, i.e. a protruding bump compared to the winding height, is detected in the envelope contour, the drum area in which said winding bump occurs can be left out during winding in order to first wind the remaining drum sections more heavily.

Alternatively or additionally to such a comparison of the detected envelope contour with a target envelope contour, the winding progression image can also be examined for the course of the winding turns on the drum and compared with a target winding progression image. For example, a preset target image of the progression of the winding of the cable can provide for crosswise winding of the drum, in which the cable windings of winding layers lying on top of each other do not run parallel to each other, but the cable turns of a winding layer above cross the winding turns of the winding layer below. Said comparison device can match the course of the cable turns determined in the winding progression image captured with the desired crosswise target winding turn and adjust the entry guide accordingly in order to achieve the desired crosswise winding turn.

The preset target envelope contour or the predefinable target winding progression image can, for example, be stored in a memory so that they can be read out for comparison. Alternatively or additionally, the controller or said comparison device can dynamically adapt the respective target envelope contour or target winding progression image to the progress of the winding process, which can be done iteratively, for example, by successively adapting an initial target envelope contour or an initial target winding progression image to the progress of the winding process, for example, depending on the additional winding turns and/or additional winding layers. For example, the number of winding layers and/or the number of winding turns can be determined in the respective winding progression image captured or on the basis of the detected envelope contour in order to adapt the stored target images in each case. Alternatively or additionally, the number of revolutions of the cable drum can be detected and used to determine how many winding layers and/or cable turns are or must be wound on the drum in order to adapt the preset target images of the envelope contour or winding progression image accordingly.

Said number of revolutions of the cable drum can also be detected by the image acquisition device. For example, the cable may comprise markings that the image acquisition device captures, such as when the respective markers pass by the camera. The image evaluation device can determine which cable length is wound up and/or unwound or how many cable layers are wound up on the cable drum on the basis of the number and/or, in the case of different markings, on the basis of the marking passing by in each case. Based on the speed of the passing markings and/or on the time elapsing between two markings, the image acquisition device can also determine the speed of the cable drum, in particular an overspeed, for example.

Advantageously, the controller can use the winding progression image captured and/or the detected envelope contour of the cable winding not only to control said entry guide, but also as a basis for an operation monitoring which, if required or in case of imminent danger, provides a warning signal and/or automatically stops the winch operation and/or initiates suitable countermeasures, for example a re-unwinding of the cable. If, for example, despite the above-described readjustment of the cable winding envelope contour, the formation of a winding bump or excessive cutting in of the cable between two underlying cable winding turns is detected, in particular identified in the detected winding image by the image evaluation device, the controller can emit said warning signal or stop the winch operation or initiate unwinding.

Advantageously, the monitoring of the image of the progression of the winding of the cable on the cable drum by the detection unit can also be used to determine relevant cable parameters of the cable to be wound up, for example its replacement state and/or its cable diameter and/or its cable elongation. In particular, faults or wear points on the cable can be identified in the winding progression image captured by the optical image acquisition means, for example by the image evaluation device detecting splices of the cable sheath and/or color changes on the cable sheath in the captured image, which can occur, for example, when a sheath layer wears and an underlying, differently colored cable layer or cable strand becomes visible.

Alternatively or additionally, the image evaluation device may comprise a cable diameter determination device to determine the cable diameter of the cable to be wound onto the drum. Based on the determined cable diameter, the controller can conclude the wear condition of the cable, especially if a diameter reduction exceeds a predetermined level.

In particular, however, the controller can also adjust the control of the entry guide depending on detected changes in the diameter of the cable to be wound or unwound, for example increasing or decreasing the adjustment speed when the cable diameter increases or decreases.

For example, a cable diameter can be determined in a simple manner using a cable diameter marking that can be determined in an image reproducing the cable by the image evaluation means. For example, the cable diameter can be color-coded, e.g. in such a way that an outer layer is colored differently from a cable layer located further inside or below. If the color of an inner layer is detected, it can be assumed that the minimum permissible cable diameter has not been reached. Alternatively or additionally, the cable diameter can also be determined on the basis of the distance of the edge contours of the cable or measured in an image reproducing the cable, in particular if a distance of the camera from the cable and/or a focal length are known and/or a scale and/or length indicator are superimposed on the image.

Advantageously, the detection unit and the controller are configured to operate continuously and/or online in order to continuously detect and evaluate the winding progression image and/or said further cable parameters and to take the corresponding, said control measures. Measurement data acquisition and its evaluation can be carried out in particular while the cable is progressing.

Alternatively or additionally, the image evaluation device may comprise cable length determining means which can determine the cable length wound onto the cable drum and/or the cable length unwound therefrom. For example, markings can be provided on the cable at a predetermined distance from one another, for example in the form of cable sheath sections that are predetermined in terms of color and/or geometry, so that the image evaluation device can determine the markings that can be identified in terms of color and/or geometry in the winding progression image captured and/or cable image of the entering cable. If necessary, in conjunction with the signal from a winch encoder which records or indicates the revolutions of the cable drums, the image evaluation device and/or the controller can determine how many winding turns and/or winding layers should be on the drum and/or in what way a target winding progression image and/or a target envelope contour must look.

Alternatively or additionally, according to another aspect of the present invention, the temperature of the cable to be wound onto the cable drum may be captured or determined. In an advantageous further development of the invention, the temperature detection device can have non-contact temperature determination means by means of which the cable temperature can be measured or determined without contact.

In particular, such cable temperature detection means may be integrated into said camera and/or include a thermal imaging camera directed at the winding area of the cable drum or the cable to be wound. Alternatively or additionally, however, other temperature determination means such as, for example, an infrared measuring sensor system and/or a pyrometer measuring device can be used, wherein the said temperature determination means can be integrated into the camera independently thereof or also arranged separately, preferably in such a way that the temperature determination means observe the cable winding or determine the temperature of the cable wound onto the cable drum.

Particularly in the case of high-strength fiber ropes, exceeding a temperature threshold has a non-negligible effect on cable service life, wherein, for example, a noticeable reduction in residual service life can already occur at cable temperatures of 50° C. or more.

An electronic evaluation device can be assigned to said cable temperature determination means, which determines a remaining service life of the cable on the basis of the determined cable temperature or changes a remaining service life, in particular when a predetermined temperature threshold is exceeded. Here, the said evaluation device can also take into account how long and/or how often the said temperature threshold is exceeded and/or by what amount the temperature threshold is exceeded. If necessary, the evaluation device can work with several threshold values in order to assume different influences on the remaining service life at different cable temperatures.

Alternatively or in addition to determining the change in remaining service life, the electronic evaluation device can also issue a warning signal to the machine operator and/or provide another control signal on the basis of the determined cable temperature signal. Monitoring the cable temperature can also achieve or at least support safe cable winch operation independently of the previously explained entry guide for the cable and its adjustment. When the temperature determination means are integrated into the cameras monitoring the image of the progression of the winding of the cable, not only can the combinatorial effect of said monitoring functions be achieved, but also a particularly compact, small-scale design and a dual function of the camera can be achieved.

According to a further aspect of the present invention, the actual condition of flanged wheels can also be monitored and detected, which limit the cable drum on the right and left or end sides or laterally limit the winding area on the cable drum, so that the cable can only be wound onto the cable drum between the two flanged wheels. When winding cables in multiple layers, the two flanged wheels mentioned above are usually subjected to high lateral forces and the cable drum is loaded by the cable stack. The axial load on the end or flanged wheels, i.e. in the direction of the longitudinal axis of the drum, can cause elastic deformation of the flanged wheels. In particular, the flanged wheels can be deformed outwards, i.e. away from the cable winding area. A detection device can detect such a deformation of the flanged wheels.

If the detected flanged wheel deformation reaches or exceeds a predetermined level, and/or if the detected flanged wheel deformation does not match the winding progression image captured, the controller can, for example, change the adjustment of the entry guide, e.g. in such a way that the entry guide no longer guides the cable to be wound all the way to the flanged wheels, but reverses the adjustment movement with advance. Alternatively or additionally, the controller can issue a warning signal if the flanged wheel deformation exceeds a predetermined level or does not match the winding progression image captured, as this can be an indicator of damage to the flanged wheel and/or winding drum, for example a crack in the area of the flanged wheel base.

The flanged wheel deformation captured can be compared with an absolute limit value, which specifies a maximum permissible flanged wheel deformation. This can be, for example, a displacement and/or absolute position of the outer circumferential edge of a flanged wheel in the direction of the longitudinal axis of the drum. Alternatively or additionally, however, a variable, permissible threshold value for the flanged wheel deformation can be specified, which depends on the winding of the cable drum. If, for example, only one winding layer is on the cable drum, the flanged wheel itself may not yet show any significant deformation, since there is a lack of lateral forces due to several winding layers. In this respect, the permissible threshold value can be set differently depending, for example, on the winding layers located on the cable drum, in particular those identified in the winding progression image captured. The permissible deformation value can be set increasingly larger with increasing winding layers.

Said flanges may, in a manner customary per se, have a substantially radial extension with respect to the axis of the cable drum and/or may rise substantially at a right angle from the cable drum. Alternatively, however, said flanged wheels can also be set at an angle and/or extend at an incline relative to a radial plane, for example, they can be essentially frustoconical in shape. Such inclined flanged wheels can be particularly useful for crosswise winding the cable drums.

The monitoring of the flanged wheel deformation can be carried out independently of a radial or obliquely adjusted contouring of the flanged wheel and can be helpful for the monitoring of a safe operation of the cable winch independently of the previously explained entry guide for the cable to be wound up and the adjustment thereof.

Due to the improved monitoring of the winding progression image or the improved control of the adjustment of the entry guide relative to the cable drum, the cable drum can be designed without a cable groove, if necessary. In principle, however, the cable drum can also have a groove.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
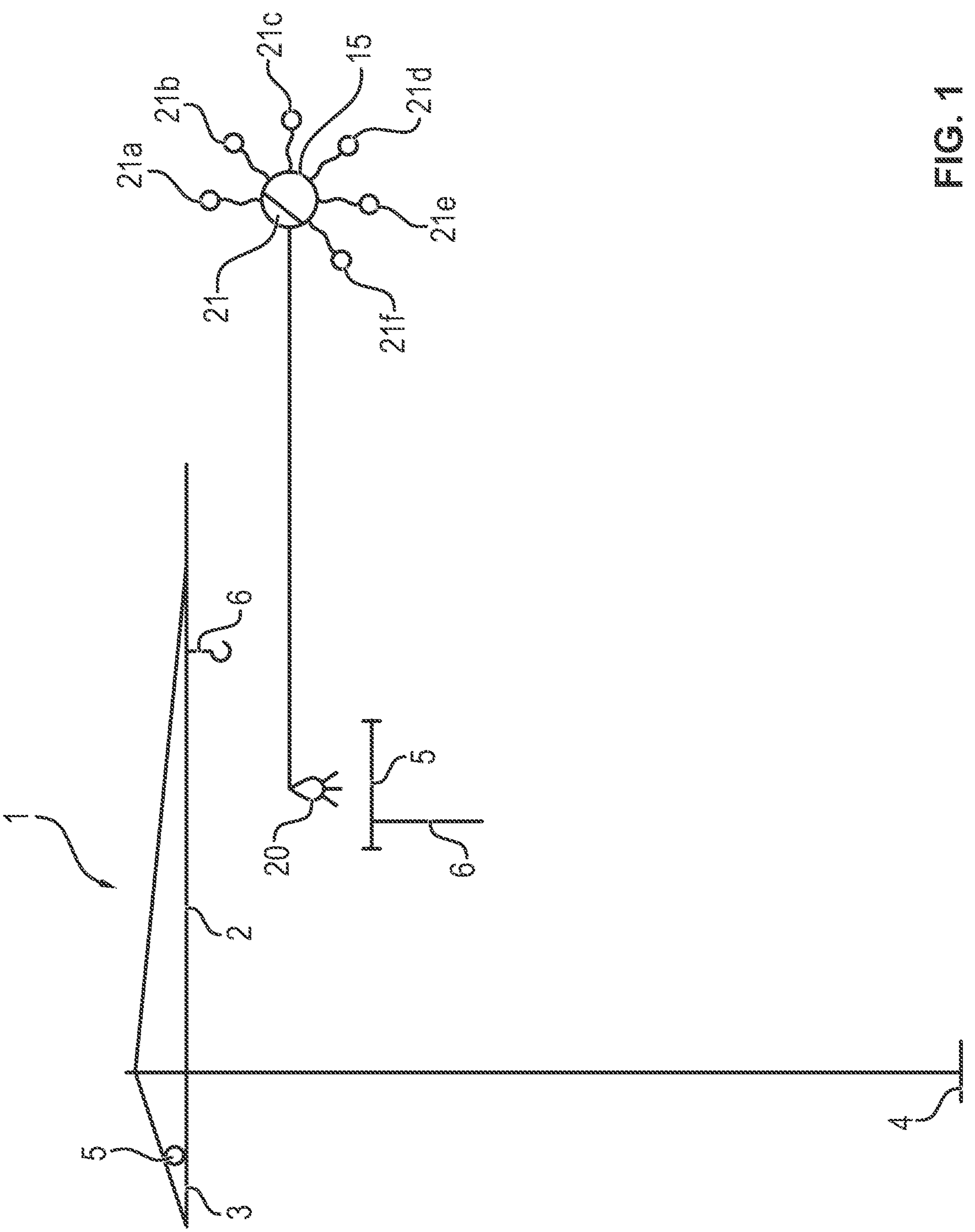
FIG. 1: a hoisting device in the form of a crane, from the boom of which there runs off a hoist cable, which can be wound onto a cable winch.

As FIG. 1 shows, the cable winch 5 can be used in a hoisting device 1, which can be configured as a crane, for example in the form of a tower crane. Independently thereof, the cable winch 5 serves to wind up a cable 6 which, when the cable winch 5 is used in the hoisting device 1, can be its hoist cable. If the hoisting device 1 is configured as a crane, the cable 6 can, for example, run off a boom 2 and carry a load hook that can be raised and lowered by retracting or unwinding the cable 6. Independently thereof, the cable winch 5 may be arranged, for example, on a counter boom 3 of the crane or on a revolving stage 4, which may support the boom 2 directly or a tower to which the boom 2 may be articulated.

Said cable 6 may be, in particular, a high-strength fiber rope of the type described at the beginning or another cable which has limited resistance under compressive stresses. In principle, however, the cable winch 5 can also be used to wind up conventional steel cables.

Figure 2B:
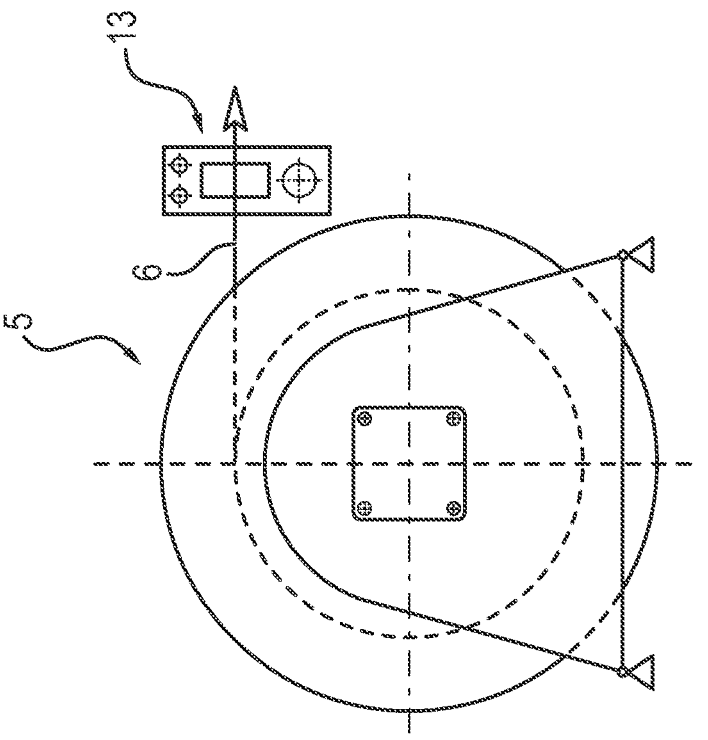
FIG. 2: a representation of the cable winch of the hoisting device of FIG. 1, wherein the partial view (a) shows a top view and the partial view (b) shows a side view of the lifting winch, wherein an uneven cable winding with a correspondingly curved envelope curve is shown on the cable drum, as can occur in the case of inadequate regulation of the adjustment of the entry guide.
Figure 2A:
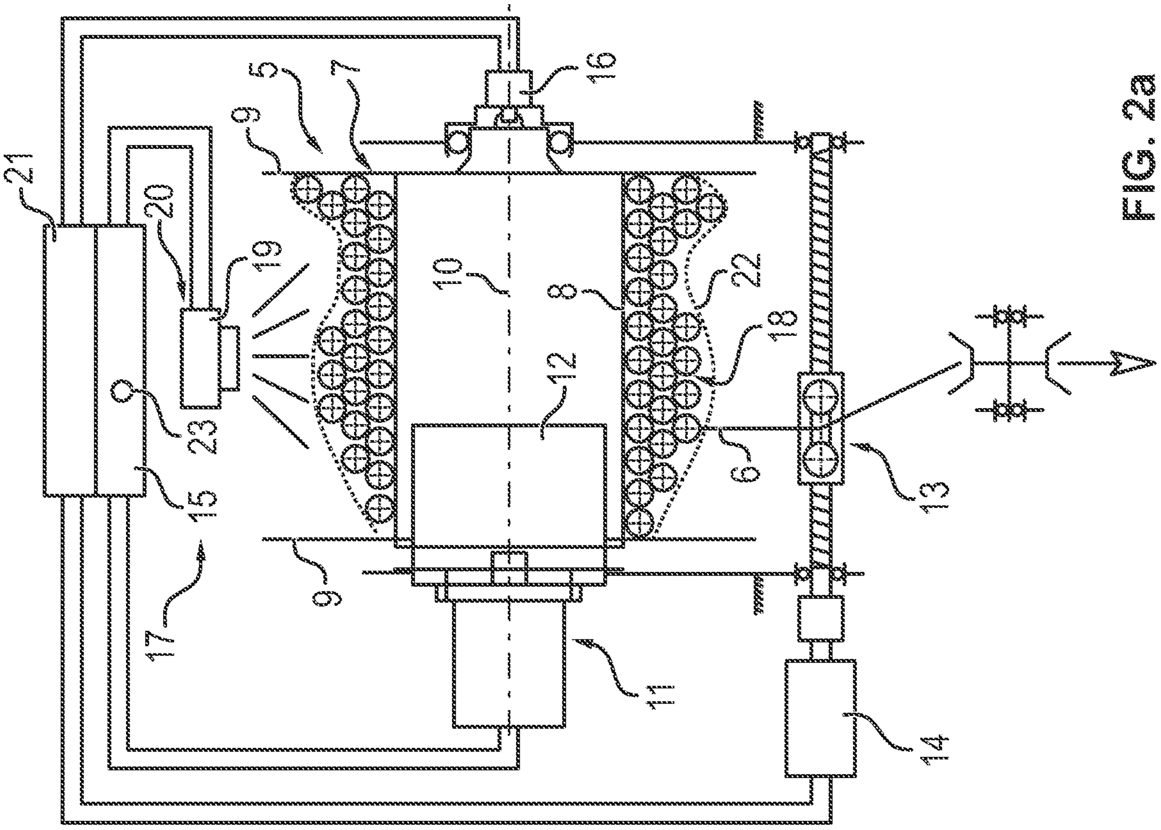
Figure 3:
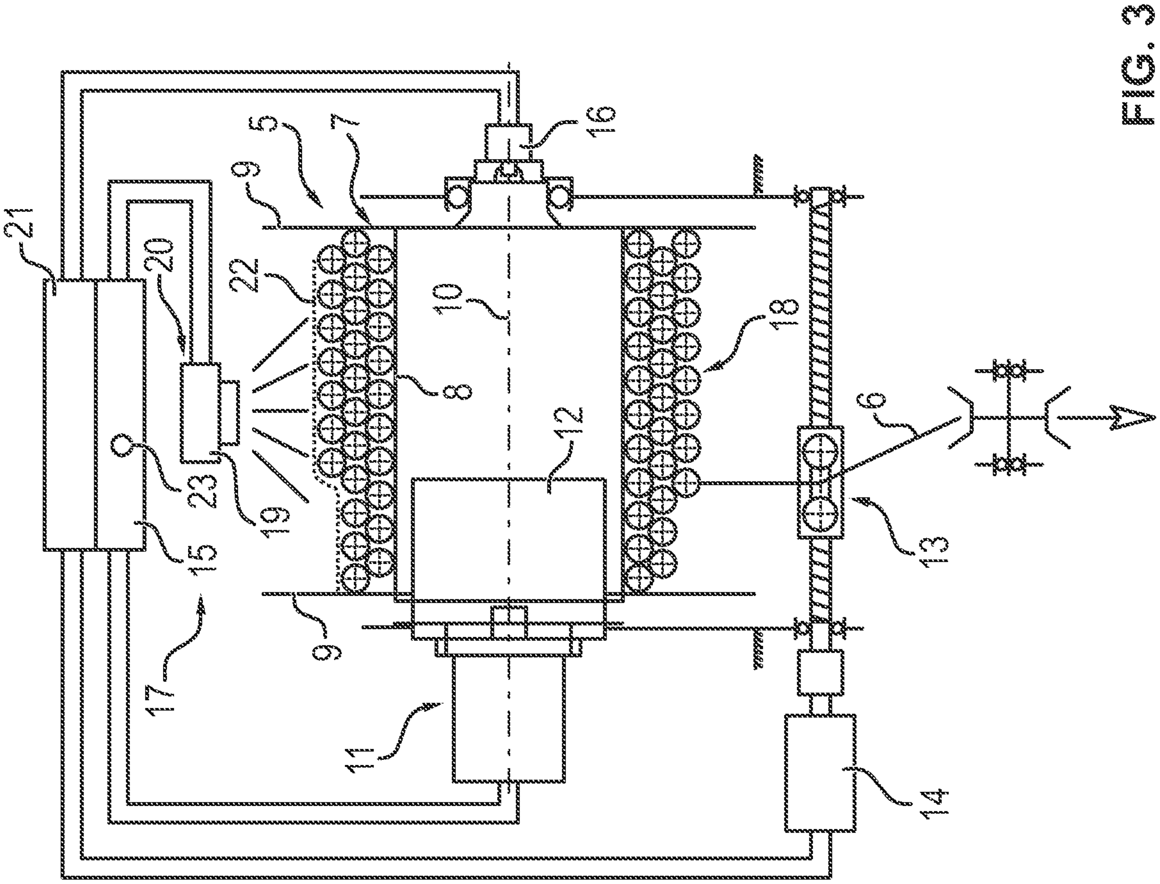
FIG. 3: a top view of the cable drum of FIG. 2, showing a uniform cable winding with a stepped envelope contour when the adjustment of the entry guide has been adjusted.
Figure 4:
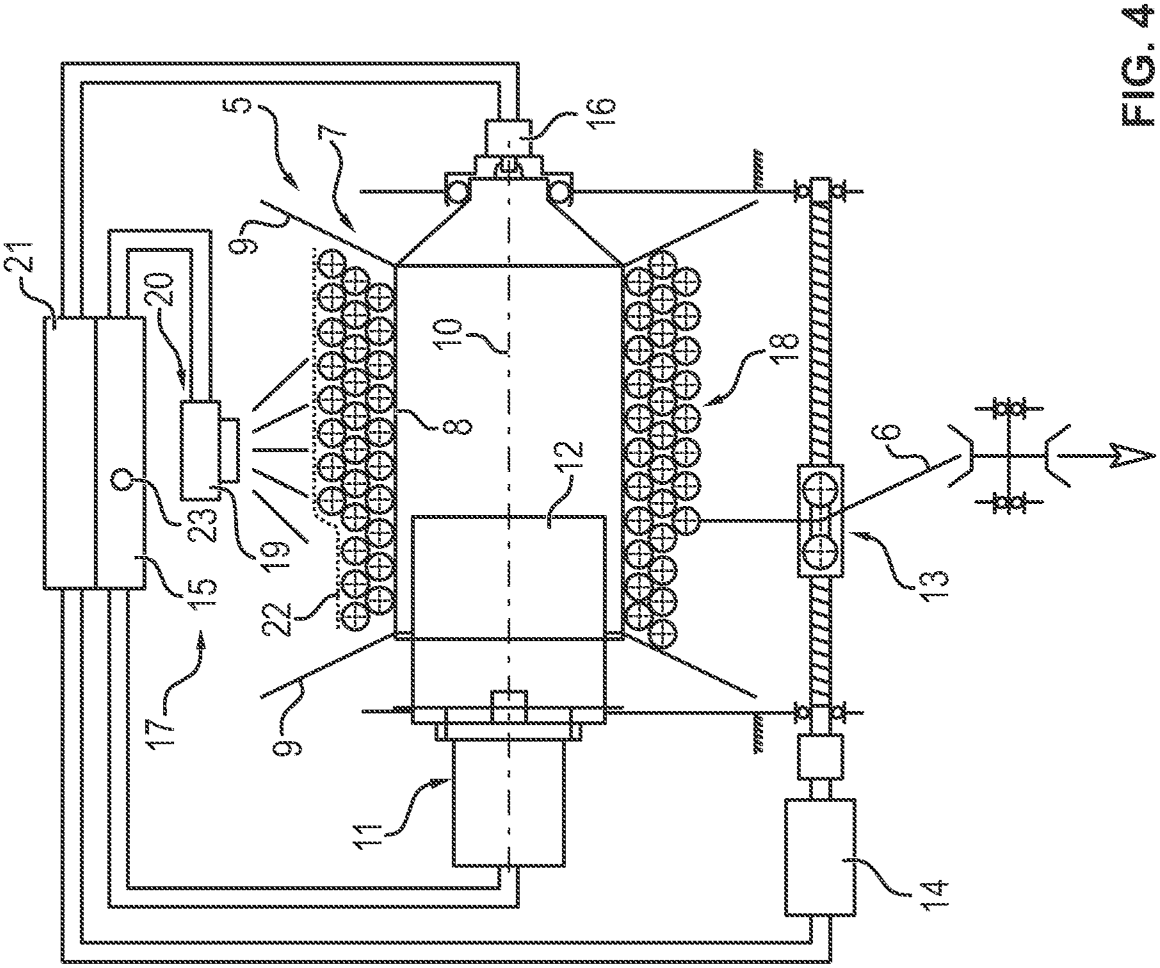
FIG. 4: a top view of a cable winch similar to FIG. 2, wherein the cable winch has inclined flanged wheels to facilitate crosswise winding of the drum.

As shown in FIGS. 2-4, the cable winch 5 comprises a cable drum 7 which may have a substantially cylindrical drum shell 8. On the outer circumferential side, the drum shell 8 can be smooth, i.e. without cable grooving, although grooving could also be provided.

Flanged wheels 9 can be arranged on the right and left or on the end face sections of the cable drum 7, which delimit the cable winding area together with the drum shell 8. Said flanged wheels 9 project outwardly beyond the drum shell 8 transversely to the drum longitudinal axis 10, wherein the flanged wheels 9 may extend substantially radially or perpendicularly to the drum longitudinal axis 10, as shown in FIGS. 2 and 3. Alternatively, it may be advantageous to use inclined flanged wheels 9, which may extend at an acute angle to planes perpendicular to the longitudinal axis 10 of the drum. In particular, as shown in FIG. 4, said flanged wheels 9 can extend inclined away from each other so that the sides of the flanged wheels 9 facing the winding area are set in a V-shape. In other words, the flanged wheels 9 may be inclined such that the distance between the flanged wheels 9, measured in the direction of the drum longitudinal axis 10, increases with increasing distance from the drum shell 8. Regardless of the inclination of the flanged wheels 9, their inner contour may be formed straight ahead when viewed in a cross-section of the cable winch, see FIGS. 2, 3 and 4.

Such inclined or slanted end plates can in particular facilitate the crosswise winding.

The cable drum 7 can be rotationally driven by a winch drive 11, wherein said winch drive 11 can, for example, comprise a hydraulic motor or an electric motor, the driving motion of which can be transmitted to the cable drum 7 directly or via a winch transmission 12. The winch drive 11 and/or the winch transmission 12 can be partially or completely recessed inside the cable drum 7.

The cable 6 to be wound onto the cable drum 7 is guided during winding by means of an entry guide 13. Said entry guide 13 may, for example, comprise two guide rollers between which the cable 6 passes, or may also comprise a sliding guide eye which guides the cable. Said entry guide 13 guides the cable transversely to the cable longitudinal direction, in particular in a direction at least approximately parallel to the drum longitudinal axis 10.

The entry guide 13 can be adjusted transversely to the cable longitudinal direction, in particular the adjustment direction of the entry guide 13 can be at least approximately parallel to the drum longitudinal axis 10.

The adjusting device for the entry guide 13 may comprise a spindle or a carriage guide or a similar linear guide, so that the entry guide 13 can be adjusted approximately parallel to the longitudinal axis 10 of the drum.

An adjustment drive 14 for adjusting the entry guide 13 relative to the cable drum 7 can, for example, have an electric or hydraulic motor 15 which rotationally drives a drive spindle. Alternatively or additionally, however, a pressure medium cylinder can also be provided for adjusting the entry guide 13, for example.

The adjustment drive 14 is controlled by an electronic controller 15, which can take into account the speed and/or rotational velocity of the cable drum 7 for the adjustment of the entry guide 13. Said speed and/or rotational position and/or rotational velocity of the cable drum 7 may be detected by a winch rotation sensor 16 or other rotation detection device and reported to the controller 15.

As FIGS. 2-4 show, a detection unit 17 is also provided which detects the winding progression image of the cable winding 18 on the cable drum 7 so that the controller 15 can adjust the adjustment of the entry guide 13 to the winding progression image that is formed.

Said detection unit 17 may comprise at least one camera 19 and/or at least one imaging sensor and/or, in general, an optical image acquisition device 20 which observes the cable drum 7, in particular its winding area, and provides an image of the cable 6 winding on the cable drum 7. Where appropriate, the image acquisition device 20 may also include a plurality of cameras 19 and/or a plurality of imaging sensors observing different sections or different sectors of the cable drum 7, for example, opposing sectors or four quadrants of the cable drum 7.

The image acquisition device 20 monitors the cable drum 7, in particular its cable winding 18 and/or the cable 6, even during ongoing winding operation, wherein images of the cable winding can be provided continuously or at least cyclically. In particular, a live image can be transmitted to the controller 15 and/or an image evaluation device 21.

Said image evaluation device 21 analyzes the image transmitted from the image acquisition device 20, wherein at least one characteristic of the winding progression image can be determined. In particular, said image evaluation device 21 can determine the envelope contour 22 of the cable winding 18 on the cable drum 7. As FIG. 2 shows, said envelope contour 22 can have a curved or serpentine or at least partially curved, for example indented or bulged, course, in particular if the adjustment of the entry guide 13 is not controlled and/or regulated in such a way as to adapt the adjusting envelope contour to a predefinable target envelope contour. Said target envelope contour can in particular be essentially cylindrical or, viewed in cross-section, straight or stepped, in particular with longer straight contour sections approximately parallel to the longitudinal axis 10 of the drum, as shown in FIGS. 3 and 4. Advantageously, a step in the envelope contour can be provided only in the transition area between a lower-layer winding and a multilayer winding, but otherwise approximately straight contour sections as viewed in section.

Said envelope contour 22 can basically be determined by the image evaluation device 21 by connecting the radially outermost cable surface sections, whereby a polygonal tensile profile resulting from this can be rounded if necessary, as FIG. 2 illustrates.

As explained at the beginning, said image evaluation device 21 can analyze pixels and/or evaluate pixel patterns, identify and/or determine contour gradients, identify or evaluate grayscale and/or light/dark patterns, identify colors and/or determine color deviations and/or gradients, and/or determine color area components in the captured image.

In particular, the image evaluation device 21 may comprise contour evaluation means 21*a* which can determine said envelope contour 22 and, if necessary, also the course of the cable turns on the cable drum 7.

Furthermore, the image evaluation device 21 may comprise color pattern evaluation means 21*b* which can determine color patterns in the captured image and from this determine the envelope contour 22 and/or identify colored markings on the cable 6.

Furthermore, said image evaluation device 21 may also comprise color area fraction evaluation means 21*c* which can determine color area fractions in the captured image and, if necessary, determine the envelope contour 22 and/or the number of winding layers therefrom.

Furthermore, the image evaluation device 21 may comprise cable length determining means 21*d* capable of determining a length of the cable 6 wound onto the cable drum 7 and/or the length of the cable unwound therefrom, for example on the basis of colored and/or gray scale characteristic and/or geometric markings on the cable 6, which may be applied to and/or incorporated in the cable 6 at predetermined intervals. Said cable length determining means 21*d* can identify markings passing by the image acquisition device 20 in the running cable and determine the length of the wound cable based on their number.

Furthermore, the image evaluation device 21 may comprise diameter determining means 21*e* for determining the cable diameter of the cable 6, in particular of a cable section to be wound onto the cable drum 7. Alternatively or additionally, the cable diameter of an already wound cable section can be determined.

The controller 15 can variably control the adjustment drive 14 of the entry guide 13 depending on the winding progression image detected. In particular, a comparison device 23 can compare the envelope contour 22 of the cable winding 18 detected or determined by the detection device 17 with a predetermined desired envelope contour, wherein the adjustment device 15 can adjust the entry guide 13 on the basis of detected deviations between the actual envelope contour 22 and the target envelope contour in order to match the actual winding progression image as closely as possible to the target winding progression image or to match the actual envelope contour as closely as possible to the target envelope contour.

Alternatively or additionally, the controller 15 can adjust the entry guide 13 in such a way that the cable drum 7 is wound crosswise and a target, crosswise target winding progression image is maintained as far as possible.

Alternatively or additionally, the controller 15 can emit a warning signal and/or a discard signal and/or a control signal if the image evaluation device 21 determines a predetermined change in the detected or determined cable diameter in the manner already explained at the beginning and/or predetermined deviations occur between the detected or determined cable length of the cable wound onto the cable drum 7 and the speed and/or rotational velocity and/or rotational position of the cable drum 7 determined by the winch rotation sensor 16.

In particular, the controller 15 can be configured to dynamically adjust the control of the entry guide 13 depending on a detected change in cable diameter, in particular to increase or decrease the adjustment speed of the entry guide 13 if the cable diameter is reduced or increased, for example, by varying the cable tension forces. Such an adjustment can be made in particular online during the winding and/or during the unwinding of the cable.

Furthermore, the image acquisition device 20 can also be used to monitor deformation of the flanged wheels 9. In particular, the image evaluation device 21 can comprise flanged wheel deformation determining means **21*f* which evaluates the captured image of the cable drum 7 for a deformation of the flanged wheel 9, in particular whether and to what extent the flanged wheel 9, for example their outer circumferential edge sections, bend in the direction of the drum longitudinal axis 10. For example, in the camera image of the cable drum 7 provided by the camera 19, the distance between the flanged wheels 9 can be determined, which can be taken as a measure of the deformation of the flanged wheels 9. Alternatively or additionally, the distance of each flanged wheel 9** individually from a drum center can be determined and taken as a measure of flanged wheel deformation. This allows effects to be masked out which, for example, could falsify the actual detection if both flanged wheels are deformed in the same direction.

In a further embodiment of the invention, a temperature determination device can determine the cable temperature of the cable 6 to be wound onto the cable drum 7, wherein said temperature determination device can advantageously be integrated into said camera 19 and/or combined with said camera 19 to form a detection assembly or unit. Independently of this, said temperature determination device can be configured to observe the cable running onto the cable drum 7 and/or the cable winding forming there.

Said temperature determination device advantageously comprises non-contact temperature determination means, for example in the form of an infrared temperature sensor and/or a thermal imaging camera, the image of which can be evaluated by an image evaluation device in order to determine the cable temperature.

An electronic evaluation device, which may be integrated in the electronic controller 15, for example, can use the determined cable temperature to determine or change a remaining service life of the cable and/or determine its remaining service life, although other parameters may also be taken into account for this purpose, as explained previously.

As can be seen from the above explanations, considerable advantages can be achieved by feed regulation or control at the entry guide using an optical camera or image acquisition system, which in particular comprise the following aspects:

- detection of the image of the progression of the winding of the cable and control of the cable guiding device (the winding process here can take place not only, as is known, cable layer next to cable layer, but also crosswise, depending on the design of the cable).
- In order to facilitate crosswise winding, the end plates can also be designed at an angle, see e.g. FIG. 3.
- Specification of an envelope geometry as the target geometry and readjustment of the cable guiding device.
- Measuring the cable diameter to draw conclusions about the wear condition of the cable.
- In case of color-marked minimum cable diameter, a warning can be output, or in case of continuous color-marking, an output of the remaining service life of the cable can be output.
- In the case of color or geometrically marked distance markings in the longitudinal direction of the cable, it is possible to carry out a length measurement of the wound or unwound cable.
- Detection of end plate deformation allows conclusions to be drawn about incipient defects in the end plates or in the drum of the cable drive; in the case of end plate deformation, the cable drum is also in the force flow at the same time.
- Furthermore, the cable drum can be configured without grooving or it can be completely re-set according to the cable stiffnesses.
- Eliminating the grooving or simplifying the cable drum grooving results in manufacturing advantages.
- The service life of the cable can be significantly increased compared to an unguided spooling system.
- The cable is continuously monitored to the end of its service life.
- The camera system can still be used to record the temperature of the cable, which is integrated into the camera. The importance of temperature measurement is explained by the fact that fiber ropes have a non-negligible impact on cable service life when a temperature threshold is exceeded. Depending on the composition of the cable configuration, this influence already sets in at 50° C. and naturally increases with rising temperature.

I claim:

1. A cable winch comprising a hoisting gear winch of a hoisting device, wherein the hoisting gear winch is for winding and unwinding a cable, the hoisting gear winch comprising:

- a cable drum;
- an entry guide for guiding the cable to be wound onto and unwound from the cable drum;
- an actuating drive for adjusting the entry guide relative to the cable drum;
- a controller for controlling the actuating drive; and
- an image evaluator configured to determine a deformation of flanged wheels, which together with a drum shell delimit a winding region of the cable drum and project beyond the drum shell, from an image of the cable drum,
- wherein the controller is configured to change an adjustment of the entry guide and/or to emit a warning signal and/or to stop winch operation when a predetermined flanged wheel deformation is exceeded.

2. The cable winch of claim 1, wherein the controller is configured to dynamically adapt the adjustment of the entry guide depending on a change in a cable parameter detected during the winding and/or unwinding of the cable to increase and/or decrease an adjustment speed depending on a cable diameter changing due to varying cable tension forces.

3. The cable winch of claim 1, further comprising a detection device for detecting the cable and an image of the progression of the winding of the cable on the cable drum, wherein the detection device is configured to determine an envelope contour of a cable winding on the cable drum, wherein the controller is configured to variably adjust the entry guide relative to the cable drum as a function of the envelope contour.

4. The winch of claim 3, wherein the controller is configured to adjust the entry guide relative to the cable drum depending on the detected cable and the winding progression image captured.

5. The cable winch of claim 1, further comprising a detection device for detecting the cable and an image of the progression of the winding of the cable on the cable drum, wherein the detection device comprises an optical image acquisition device for detecting an image of a cable winding and the image evaluator for evaluating the image of the cable winding and determining parameters of an image of a progression of an envelope contour of the cable winding and/or a cable diameter.

6. The cable winch of claim 5, wherein the image evaluator is configured to determine the envelope contour of the cable winding from the image of the cable winding.

7. The cable winch of claim 5, wherein the optical image acquisition device comprises at least one camera observing the cable drum.

8. The cable winch of claim 7, wherein the image evaluator is configured to determine the envelope contour of the cable winding from the image of the cable winding.

9. The cable winch of claim 1, wherein the image evaluator is configured to determine a pitch and/or a spacing of the winding turns on the cable drum from the image of the cable winding.

10. The cable winch of claim 1, wherein the controller has a comparison device for comparing a detected or determined actual envelope contour with a predetermined target envelope contour and is configured to adjust the entry guide depending on deviations between the actual envelope contour and the predetermined target envelope contour determined during the comparison.

11. The cable winch of claim 10, wherein the controller is configured to dynamically adapt the predetermined target envelope contour as the cable winding and/or cable unwinding progresses.

12. The cable winch of claim 1, wherein the controller has a cross-winding mode of operation in which the controller adjusts the entry guide so the cable is wound crosswise onto the cable drum.

13. The cable winch of claim 12, wherein the controller is configured to compare a detected actual winding progression image with a predetermined target crosswise winding progression image and to adjust the entry guide depending on deviations between the detected actual winding progression image and the predetermined target crosswise winding progression image.

14. The cable winch of claim 1, wherein the image evaluator is configured to determine a cable diameter of the cable to be wound onto the cable drum.

15. The cable winch of claim 1, wherein the image evaluator is configured to determine a cable length of the cable wound onto the cable drum and/or the cable unwound from the cable drum on the basis of cable markings identified in an image of the cable.

16. The cable winch of claim 1, wherein the image evaluator is configured to identify a distance between the flanged wheels in a camera image and/or determines a distance of each flanged wheel from a drum center.

17. The cable winch of claim 1, further comprising a temperature determiner for determining a temperature of the cable, wherein the controller is configured to determine a remaining service life of the cable depending on the determined cable temperature and/or to emit a warning signal and/or a predetermined control signal when a predetermined cable temperature is exceeded.

18. The cable winch of claim 17, wherein the temperature determiner comprises a thermal imaging camera directed at the cable drum or the cable and/or is integrated into the camera of an image acquisition device observing the cable drum, wherein the image evaluator is configured to determine the cable temperature from the image of the cable drum and/or an image of the cable.

19. The cable winch of claim 1, wherein the cable drum has a smooth, grooves-free drum shell.

20. The cable winch of claim 1, wherein the cable drum has inclined flanged wheels which delimit between them a winding region which widens outwards with increasing distance from the drum shell.

21. The cable winch of claim 1, wherein the hoisting device comprises a crane.

22. A cable winch comprising a hoisting gear winch of a hoisting device, wherein the hoisting gear winch is for winding and unwinding a cable, the hoisting gear winch comprising:

a cable drum;

an entry guide for guiding the cable to be wound onto and unwound from the cable drum;

an actuating drive for adjusting the entry guide relative to the cable drum;

a controller for controlling the actuating drive; and an image evaluator configured to determine a deformation of flanged wheels, which together with a drum shell delimit a winding region of the cable drum and project beyond the drum shell, from an image of the cable drum, wherein the image evaluator is configured to identify a distance between the flanged wheels in a camera image and/or to determine a distance of each flanged wheel from a drum center, and wherein the controller is configured to change an adjustment of the entry guide and/or to emit a warning signal and/or to stop winch operation when a predetermined flanged wheel deformation is exceeded.

23. The winch of claim 22, further comprising a detection device for detecting the cable and an image of the progression of the winding of the cable on the cable drum wherein the controller is configured to adjust the entry guide relative to the cable drum depending on the detected cable and the winding progression image captured.

* * * * *